United States Patent [19]
Moser

[11] 4,000,038
[45] Dec. 28, 1976

[54] NUCLEAR POWER STATION

[75] Inventor: Paul Moser, Dietlikon, Switzerland

[73] Assignee: Brown Boveri-Sulzer Turbomaschinen Aktiengesellschaft, Zurich, Switzerland

[22] Filed: Mar. 27, 1975

[21] Appl. No.: 562,761

[30] Foreign Application Priority Data

Apr. 11, 1974 Switzerland .................. 5167/74
Apr. 26, 1974 Germany ...................... 2420924

[52] U.S. Cl. .................................. 176/38; 176/87
[51] Int. Cl.² ............................................ G21C 9/00
[58] Field of Search ................ 176/37, 38, 39, 87

[56] References Cited
UNITED STATES PATENTS

| | | | |
|---|---|---|---|
| 3,079,995 | 3/1963 | Natland | 176/87 |
| 3,115,194 | 12/1963 | Adams | 176/39 |
| 3,262,857 | 7/1966 | Schlicht et al. | 176/39 |
| 3,325,373 | 6/1967 | Schlicht et al. | 176/39 |
| 3,712,851 | 1/1973 | Isberg et al. | 176/38 |

OTHER PUBLICATIONS
Nuclear News, (5/71), pp. 36–39.
Proceedings of the Third International Conference on Peaceful Uses of Atomic Energy, (1965), vol. 13, pp. 411–419.
2nd U.N. Geneva Conference on Atomic Energy, vol. II, pp. 101–106, (1958).
Proceedings of Third Int. Conf. on Peaceful Uses of Atomic Energy, (1965), vol. 5, pp. 411–436.
Nuclear Power, vol. 8, 1963, pp. 37–50.

*Primary Examiner*—Samuel W. Engle
*Assistant Examiner*—S. A. Cangialosi
*Attorney, Agent, or Firm*—Robert A. Ostmann

[57] ABSTRACT

Nuclear power station having a reactor buried in rock and machine groups formed with the use of turbines, compressors, generators or other apparatus, inclusive gas conduits; the individual machine groups and the gas conduits are arranged in rooms hollowed out in the rock for receiving and supporting these; to each group there leads at least one tunnel hollowed out in the rock; a safety chamber for a machine group concerned is situated adjacent the group and is secludable relatively to the atmosphere.

8 Claims, 4 Drawing Figures

NUCLEAR POWER STATION

BACKGROUND OF THE INVENTION

The invention relates to a nuclear power station having a reactor arranged in natural rock or bedrock, with machine groups formed with the use of turbines, compressors, generators or other apparatus, with gas conduits and with a safety chamber for delimiting the machine groups relatively to the atmosphere.

A nuclear power station of this kind is known from the periodical "Nuclear News," May 1971, Pages 36 to 39. Above a reactor buried in rock there is arranged a safety chamber constructed in an underground pit, in which the machine groups and gas conduits required for converting the thermal energy from the reactor into electrical energy are placed and which delimits the machine groups and gas conduits relatively to the atmosphere. The periodical also draws attention to the possibility of constructing the safety chamber as a cave in the rock.

This known nuclear power station does not in fact disturb the appearance of the landscape and may be sufficiently protected from the environment and also from damaging the environment but the individual machine groups are set up in a single large safety chamber.

The outlay involved as regards work makes it necessary to limit the construction of the machine groups. It is felt necessary because of lack of space to make various compromises at the expense of the optimum design or layout for the machine groups.

SUMMARY OF THE INVENTION

The present invention has as its object to provide a nuclear power station arrangement wherein the builder can design the machine groups with greater freedom of choice.

This object is achieved in a nuclear power station of the type initially described according to the invention in that the individual machine groups and the gas conduits are arranged in rooms which are hollowed out in the rock, for supporting and receiving these, that at least one tunnel hollowed out in the rock leads from the atmosphere to each machine group, and that the safety chamber is formed by a tunnel chamber which is situated adjacent the machine group and is secludable from the atmosphere.

It is advantageous if each tunnel has a cross-section which is sufficient to allow the transport of each machine group to which it leads.

In this way a nuclear power station is obtained which is integrated in natural rock. The rock takes over the task of receiving and supporting the machine groups. The large safety chamber is substantially dispensed with. It is simply necessary to hollow out the appropriate rooms from the rock and the tunnels. This means a considerable saving in costs. The safety chamber has also been reduced to small tunnel chambers or compartments which adjoin the individual machine groups and can be closed off relative to the atmosphere. When designing the machine groups the designer is given much greater freedom of choice. The machine groups are also shielded from one another in a more satisfactory manner. The nuclear power station is completely safe as regards to influences from the environment. It also meets the requirements regarding safety in its possible effects on the environment in a more satisfactory manner.

BRIEF DESCRIPTION OF THE DRAWING

The subject of the invention is described and explained in detail with reference to the accompanying drawings wherein.

DESCRIPTION OF THE PREFERRED EMBODIMENTS

Figure 1:
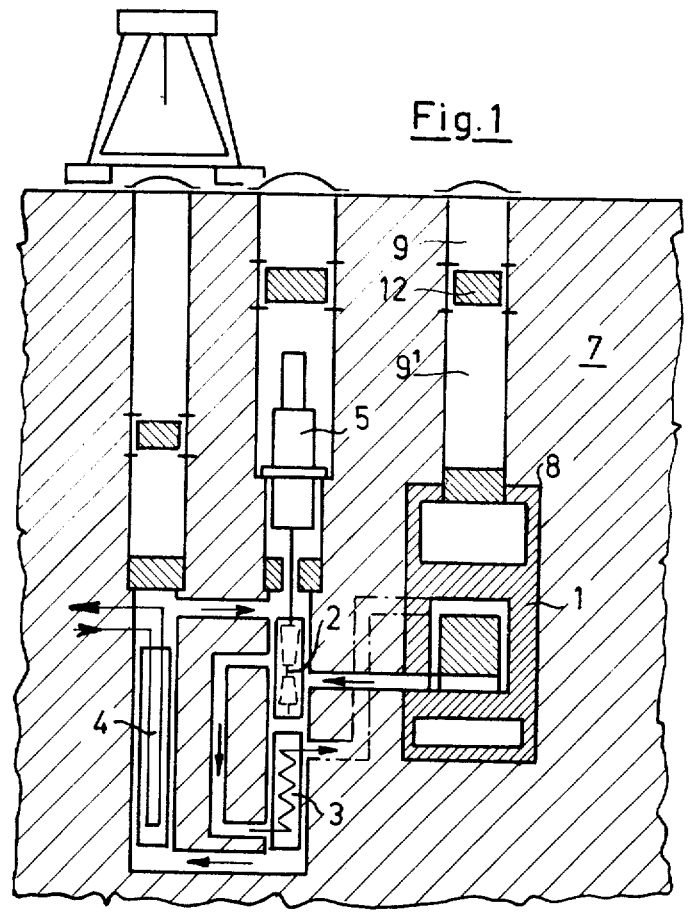
FIG. 1 shows a constructional example of the subject of the invention in a diagrammatic vertical section.

In all the illustrations like parts of the nuclear power station are provided with like reference numerals.

The nuclear power stations which are illustrated have a direct helium cycle, and each comprise a reactor 1 and the following machine groups: a turbine set 2 with a compressor and a gas turbine, other apparatus namely a heat exchanger 3 and a preliminary cooling apparatus 4, and also a generator 5 and gas conduits which are designated with arrows showing the direction of flow of the working medium, that is to say helium.

To receive and support the machine groups 1 to 5 with the gas conduits, rooms such as the room designated as 8 for example are hollowed out from the natural rock 7 in each of which a machine group such as the reactor 1 is arranged. In order to make the rooms such as for example the room 8 accessible from the atmosphere, tunnels are hollowed out from the rock 7 such as for example the tunnel 9 which connects the room for receiving and supporting the machine groups with the atmosphere.

The walls of the rooms, for example the wall of the room 8, are provided with a cast-on concrete layer 10 which takes up the pressures acting on the external wall of the machine group and bears on the wall of the room. This concrete layer 10 is cooled by means of a cooling system not shown here but arranged in the concrete layer. The concrete layer is given its own strength by a prestressed cable system and/or by reinforcements in cases where it supports an intermediate wall between two rooms which are subjected to different pressure, for example in the case of the intermediate wall 11.

In the access tunnels, as in illustrated for the tunnel 9, there is provided a chamber 9¹ which is adjacent the particular machine group concerned, in this case the reactor 1, and which is secludable by means of a door 12 relatively to the atmosphere.

Figure 3:
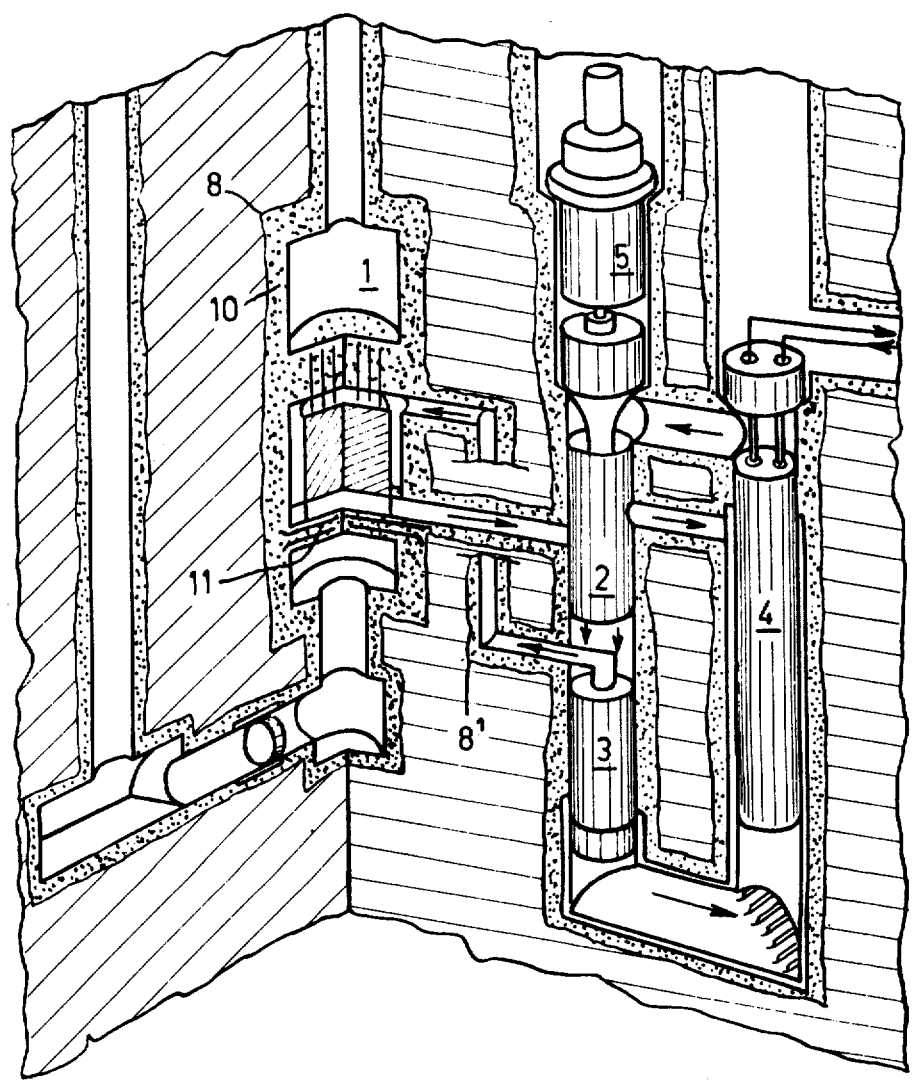
FIG. 3 shows a similar constructional example to FIG. 1 but in an axiometric diagram.

The nuclear power station shown in FIGS. 1 and 3 is accessible from above. The rooms for receiving and supporting the machine group 1 to 5 and the access tunnels 9 are hollowed out substantially vertically in natural rock 7.

Figure 2:
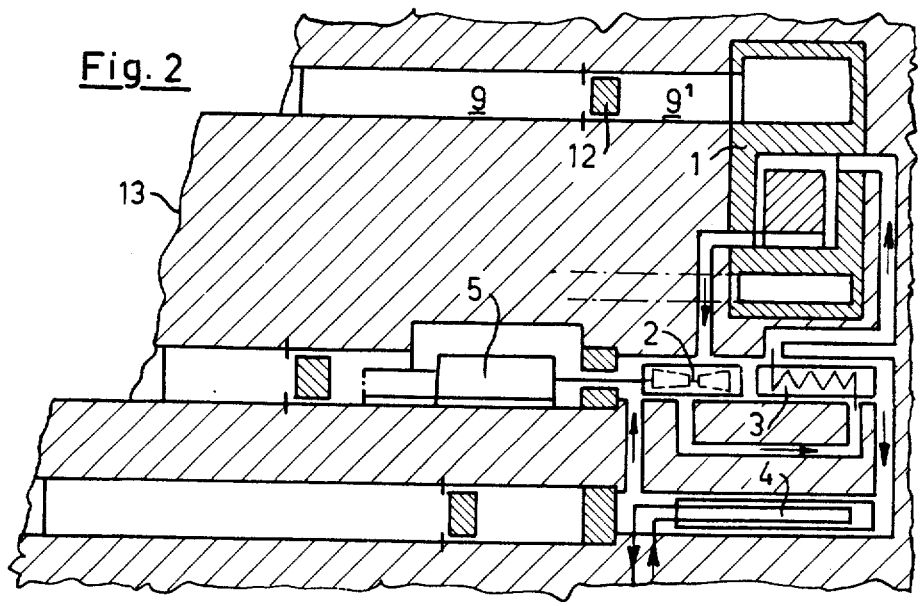
FIG. 2 shows another constructional example in vertical section.
Figure 4:
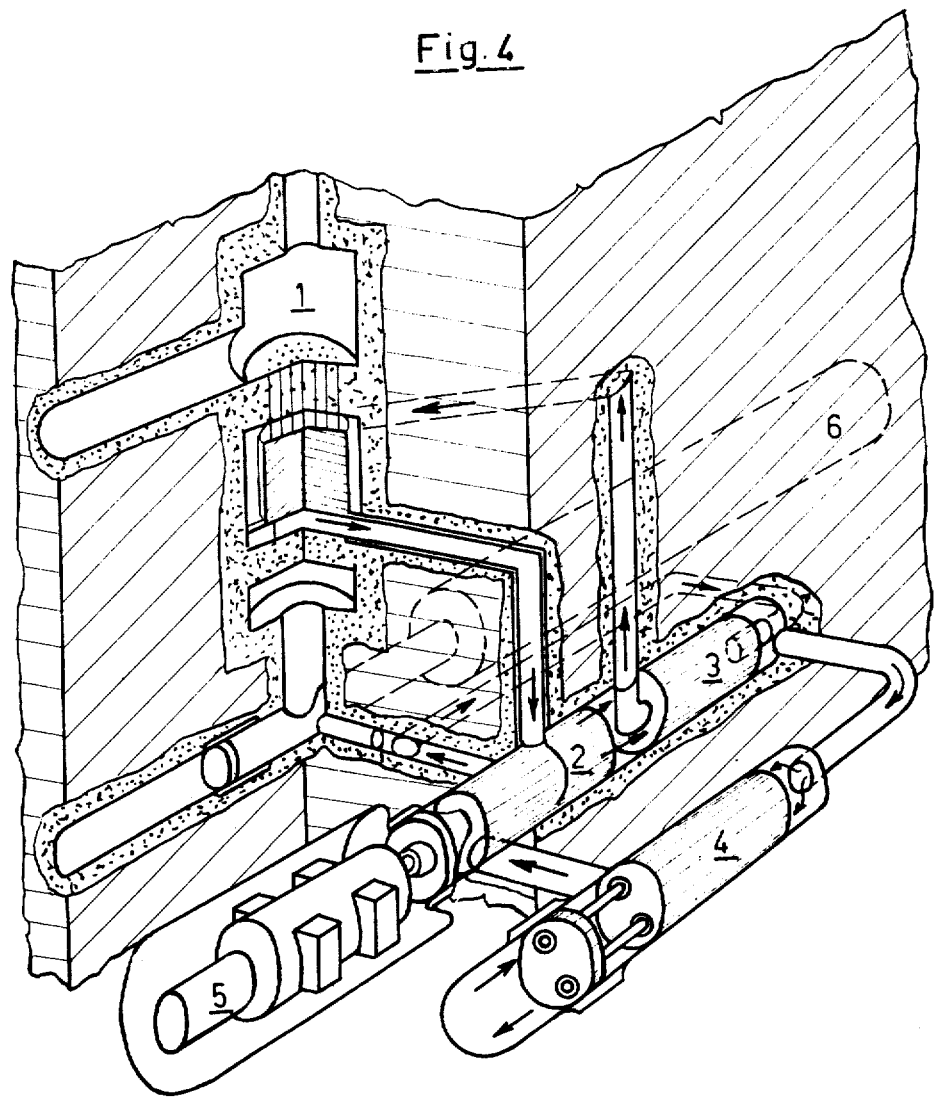
FIG. 4 shows a similar constructional example to FIG. 2 in an axiometric diagram.

The other nuclear power station which is shown in FIG. 2 and FIG. 4 is accessible from the rock face 13. The rooms and the tunnels are hollowed out substantially horizontally in the rock. 6 designates a helium store.

The tunnels 9 are so large that the machine group to which each tunnel leads can be transported through the said tunnel. At any rate the tunnels are sufficiently large to allow the largest component part of the machine group to be transported through them. For example the tunnel 9 which leads to the reactor 1 is sufficiently large to allow the largest part of the reactor 1 which, as is known per se, is assembled from component parts in the room 8 hollowed out for it, to be transported through this tunnel. The respective machine group can be transported complete through the tunnel concerned in the case of machine groups 2 to 5.

The invention is not limited to the selected constructional example of a nuclear plant station with direct helium cycle. It is also possible to construct other nuclear power station systems with different cycles in accordance with the present invention.

I claim:

1. An underground nuclear power station including a nuclear reactor, machine components such as turbines, compressors, generators and heat exchangers, and a working medium circuit formed of gas conduits interconnecting the various power plant parts, and characterized in that
    a. the machine components are divided into groups, and these groups are located in separate rooms hollowed out of rock and having walls which support the components;
    b. the conduits are situated in, and supported by the walls of, separate shafts hollowed out of rock;
    c. each of said rooms has at least one access tunnel which is hollowed out of rock and leads to the atmosphere said access tunnel being large enough to permit transport therethrough of at least the largest component part of the machine group in the associated room; and
    d. each access tunnel has means for secluding the atmosphere from a portion of said tunnel adjacent the associated room, whereby said portion serves as a safety chamber.

2. Nuclear power station according to claim 1, in which each tunnel has a cross-section sufficient for transporting therethrough the particular machine group to which it leads.

3. Nuclear power station according to claim 1, in which the walls of the rooms hollowed out in the rock are lined with a cast-on concrete layer.

4. Nuclear power station according to claim 3, in which the concrete layer comprises steel reinforcing means at least locally.

5. Nuclear power station according to claim 3, in which in that the concrete layer contains a prestressed cable system at least locally.

6. Nuclear power station according to claim 1, in which the chambers provided in tunnels are secludable by means of doors.

7. Nuclear power station according to claim 1, in which the longitudinal axes of the rooms and the tunnels in the rock extend substantially vertically.

8. Nuclear power station according to claim 1, in which the longitudinal axes of the rooms and the tunnels in the rock extend substantially horizontally.

* * * * *